May 28, 1963     A. F. WORM     3,091,221
ANIMAL HATCH
Filed Nov. 2, 1961

*INVENTOR.*
ALAN F. WORM
BY *Shanley & O'Neil*
ATTORNEYS

United States Patent Office 3,091,221
Patented May 28, 1963

3,091,221
ANIMAL HATCH
Alan F. Worm, 1838 Dome St., Raton, N. Mex.
Filed Nov. 2, 1961, Ser. No. 149,748
8 Claims. (Cl. 119—19)

The present invention relates to animal hatches, that is, to closures for permitting animals to enter and leave an enclosure such as a building or the like. Animal hatches according to the present invention are useful, for example, as providing closures that can be operated by pets to permit the pets to enter and leave a house at will without the need for leaving a door or window open.

Accordingly, the principal object of the present invention is the provision of animal hatches that will be weather tight but still easily operable by animals, and which will be relatively simple and inexpensive to manufacture and install, easy to maintain, and rugged and durable in use.

Other objects and advantages of the present invention will become apparent from a consideration of the following description, taken in connection with the accompanying drawing, in which.

Figure 1:
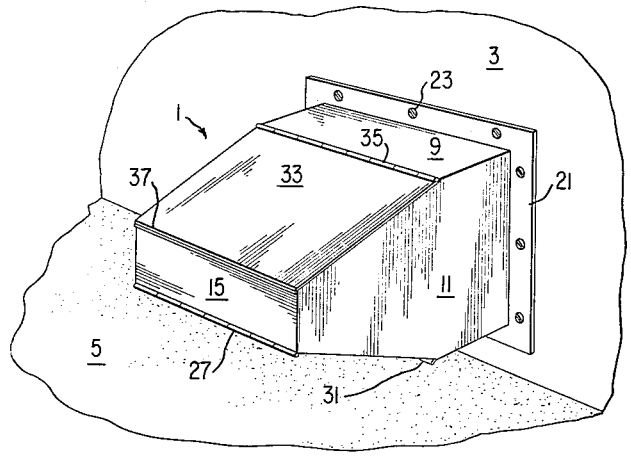
FIGURE 1 is a perspective view of an animal hatch according to the present invention in place on the wall of a building.

Referring now to the drawing in greater detail, there is shown an animal hatch indicated generally at 1 and comprising an enclosure adapted to be secured against a wall 3 of a building such as a house. Hatch 1 is secured on wall 3 a short distance above the ground level or other level on which a pet may freely walk, indicated at 5. Animal hatches according to the present invention may extend either inside or outside the building, but it is preferred that they extend outside so as to conserve space in the building and to avoid a low projection over which occupants of the building might trip and fall. Thus, the animal hatch of the present invention is an enclosure secured to and providing access into and out of a larger enclosure such as a house.

The hatch itself may be constructed of wood, metal, plastic or the like; but sheet metal such as sheet steel is preferred, it being also preferred to provide the sheet metal with a protective coating such as galvanizing and painting to retard rusting of the metal.

The enclosure which is hatch 1 includes a horizontal bottom wall 7 and a horizontal top wall 9 directly above and parallel to bottom wall 7. A pair of side walls 11 and 13 and an end wall 15 at the end of the hatch remote from the building complete the enclosure. The hatch has an open end 17 that is disposed against the building and which registers with an opening 19 of the same size and shape that extends through wall 3 between the exterior and the interior of the building. Vertical flanges 21 about top, bottom and side walls 7, 9, 11 and 13 at open end 17 are secured flat against the exterior of wall 3 about the margins of open end 19 by means of a plurality of headed fasteners 23 that pass through flanges 21 and terminate within wall 3. Of course, a variety of other means for securing the hatch to the wall could be employed, it being also possible to pass end 17 through the wall and have flanges 21 disposed on the inner side of the wall. It is important to note, however, that no matter how the hatch is secured to the wall of the larger enclosure such as a house, it will be spaced a few inches above the ground level at 5.

Bottom wall 7 includes a first gate or door 25 which is mounted for vertical swinging movement about a horizontal axis parallel to wall 3 and to top and bottom walls 7 and 9 and end wall 15 and perpendicular to the length of the hatch and to side walls 11 and 13. Indeed, in the illustrated embodiment, the axis about which door 25 swings vertically lies in the plane of end wall 15 and marks the juncture between bottom wall 7 and end wall 15. This horizontal axis is provided by a hinge 27 extending along the lower outer edge of the hatch and supported on end wall 15 and in turn supporting the outer end of door 25.

Figure 2:
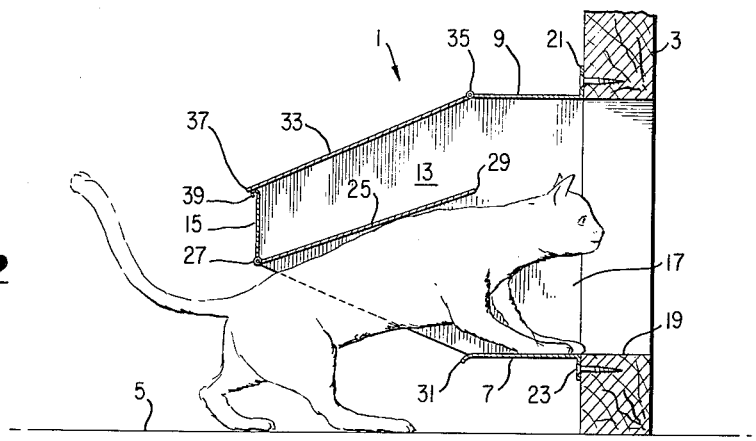
FIGURE 2 is a side cross-sectional view of an animal hatch according to the present invention, showing an animal entering the same.
Figure 3:
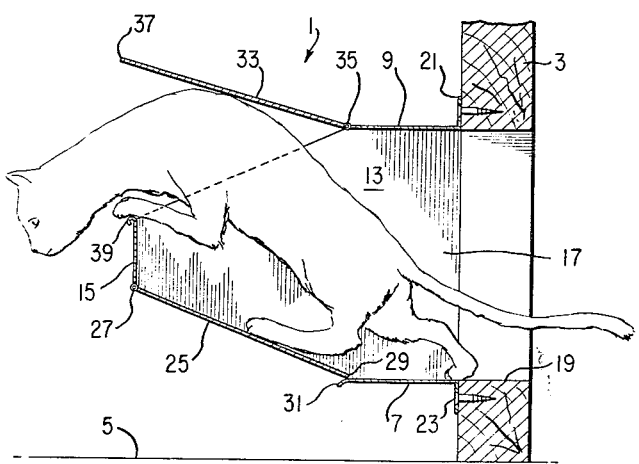
FIGURE 3 is a view similar to FIGURE 2 but showing an animal leaving the animal hatch of the present invention.

Door 25 is inclined downward away from end wall 15 toward wall 3 and terminates in a free end edge 29 opposite hinge 27. End edge 29 is horizontal but is disposed at a lower level than hinge 27 and rests on a lip 31 which marks the end of the stationary portion of bottom wall 7 that is farthest from wall 3. First door 25 can thus swing vertically between the positions shown in FIGURES 2 and 3, and even higher than the position shown in FIGURE 2 if need be; but it cannot fall below the position of FIGURE 3, for when door 25 is closed as in FIGURE 3, it rests on lip 31 and is prevented by lip 31 from moving farther downward clockwise as seen in FIGURE 3.

Top wall 9 includes a second gate or door 33 mounted for vertical swinging movement about a horizontal axis extending along its edge nearest wall 3 by a hinge 35 carried by the stationary portion of top wall 9 that is farthest from wall 3. Hinge 35 is parallel to hinge 27, and second door 33 is inclined from hinge 35 downward toward end wall 15 away from wall 3. Door 33 terminates in a horizontal end edge opposite hinge 35, which is parallel to and disposed at a lower elevation than hinge 35. Free end edge 37 rests on the upper portion of end wall 15, which is in the form of a turned-over edge 39 to avoid sharp edges on end wall 15 on which an animal might hurt itself. Of course, there are a number of other ways of avoiding a sharp edge at the upper edge of end wall 15. Thus, the lowermost position of second door 33 is shown in FIGURE 2, in which edge 37 rests on edge 39, this interengagement of edges 37 and 39 in the closed position of door 33 preventing further movement of door 33 counterclockwise beyond the position shown in FIGURE 2.

In use, with the hatch installed on the side of a building a short distance above the ground as seen in the drawing, the animal approaches the building toward door 25 and contacts door 25 with its head. This pushes door 25 up and open, and the animal can then place its paws on the upper or inner side of bottom wall 7 as seen in FIGURE 2 and enter the building through opening 19 through wall 3. As the animal passes beyond door 25, door 25 falls by gravity back to the position of FIGURE 3, thus sealing the building against the elements.

Upon leaving the building, the animal enters the hatch from the building side and approaches the closed end of the hatch until the animal's head strikes second door 33. At this time, at least the front paws of the animal are on door 25 and the animal can stand on door 25 to push door 33 open, as shown in FIGURE 3, whereupon the animal can spring down onto the ground outside the building. Thereupon, door 33 falls by gravity to the position of FIGURE 2, again sealing the building.

The relationship of doors 25 and 33 to each other and to the remainder of the hatch is very important. It should be noted that they are superposed, door 33 being directly above door 25, and door 25 being incapable of swinging clockwise downward beyond its position in FIGURE 3, so that door 25 provides a platform for the animal to leave through door 33. The parts are thus consolidated lengthwise of the hatch, so that the hatch need project from the side of the building only a minimum distance.

The opposite inclination of the doors is also very important. The inclination of door 25 as seen in FIGURE 3 is important when the animal approaches the door, for the animal can then push open the door and climb up on bottom wall 7 with a minimum of effort. The inclination of door 25 is also important when the animal is leaving the hatch, as in FIGURE 3, for this inclination provides a ramp up which the animal climbs so as to be higher relative to upper edge 39 of end wall 15, which in turn makes it easier for the animal to spring from the hatch.

Likewise, the inclination of the second door 33 is important when the animal is leaving the hatch, for it enables edge 39 to be placed desirably low and still permits the hatch to be of sufficient height that the animal can pass freely through it. Indeed, a possible but less preferred construction of the present invention eliminates end wall 15 altogether, edge 37 of door 33 in that case resting on hinge 27.

The spacing of the hatch above the ground is also important. If bottom wall 7 were against the ground, then hinge 27 would have to be of such height above the ground to permit the animal to pass under it that either door 25 would be excessively long and the length of the hatch thereby increased, or the angle of door 25 would be so steep that the animal could not use it as a ramp as in FIGURE 3 to leave the hatch. Of course, the particular dimensions and proportions of the hatch and of doors 25 and 33 will depend in large extent on the nature of the animal to be accommodated, whether a dog or a cat, and the size of the animal.

From a consideration of the foregoing disclosure, it will be evident that the initially recited object of the invention has been achieved in full.

Although the present invention has been described and illustrated in connection with preferred embodiments, it is to be understood that modifications and variations may be resorted to without departing from the spirit of the invention, as those skilled in this art will readily understand. Such modifications and variations are considered to be within the purview and scope of the present invention as defined by the appended claims.

What is claimed is:

1. An animal hatch comprising an enclosure having top, bottom and side walls and a closed end, and an open end opposite the closed end adapted to be secured to a wall of a larger enclosure, the bottom wall including a first gate mounted on the hatch for vertical swinging movement about a horizontal axis disposed on the side of the first gate opposite the open end of the hatch, means on the hatch limiting downward movement of the first gate when the first gate is closed, the top wall including a second gate mounted on the hatch for vertical swinging movement about a horizontal axis disposed on the same side of the second gate as the open end of the hatch, and means on the hatch limiting downward movement of the second gate when the second gate is closed, the first gate being beneath the second gate so that an animal can enter the hatch by pushing up the first gate, after which the first gate falls closed behind the animal, and can leave the hatch by standing on the closed first gate and pushing up the second gate, after which the second gate falls closed behind the animal.

2. An animal hatch as claimed in claim 1, in which the first gate is inclined downward away from the closed end.

3. An animal hatch as claimed in claim 2, in which the second gate is inclined downward toward the closed end.

4. An animal hatch as claimed in claim 1 in combination with an upright wall of a building having an opening therethrough, the hatch being mounted on the wall with the open end of the hatch in registry with the opening through the wall, the hatch being spaced a short distance above a generally horizontal supporting surface that extends outward from the base of the wall.

5. An animal hatch comprising an enclosure having top, bottom and side walls and an outer end, and an open end opposite the outer end adapted to be secured to a wall of a larger enclosure, the bottom wall including a first gate mounted on the hatch for vertical swinging movement about a horizontal axis disposed on the side of the first gate opposite the outer end of the hatch, means on the hatch limiting downward movement of the first gate when the first gate is closed so that the first gate can swing from its closed position vertically in only one direction about its axis, a second gate, the top wall including means mounting the second gate on the hatch for vertical swinging movement about a horizontal axis, and means on the hatch limiting vertical swinging movement of the second gate when the second gate is closed so that the second gate can swing from its closed position vertically about its axis only in the opposite direction from the first gate, the first gate being subjacent the second gate so that an animal can enter the hatch by pushing up the first gate, after which the first gate falls closed behind the animal, and can leave the hatch by standing on the closed first gate and pushing up the second gate, after which the second gate falls closed behind the animal.

6. An animal hatch as claimed in claim 5, in which the first gate is inclined downward away from the outer end.

7. An animal hatch as claimed in claim 5, in which the second gate is inclined downward toward the outer end.

8. An animal hatch as claimed in claim 5 in combination with an upright wall of a building having an opening therethrough, the hatch being mounted on the wall with the open end of the hatch in registry with the opening through the wall, the hatch being spaced a short distance above a generally horizontal supporting surface that extends outward from the base of the wall.

References Cited in the file of this patent

UNITED STATES PATENTS

| | | |
|---|---|---|
| 1,523,256 | Butler | Jan. 13, 1925 |
| 2,518,588 | Allen | Aug. 15, 1950 |
| 2,932,279 | Giles | Apr. 12, 1960 |
| 2,954,007 | Mitchell | Sept. 27, 1960 |